United States Patent [19]
Lorenz

[11] 4,138,991
[45] Feb. 13, 1979

[54] FLAT SOLAR COLLECTOR

[75] Inventor: Johann Lorenz, Dachau, Fed. Rep. of Germany

[73] Assignee: Maschinenfabrik Augsburg-Nurnberg Aktiengesellschaft-Man, Munich, Fed. Rep. of Germany

[21] Appl. No.: 819,687

[22] Filed: Jul. 27, 1977

[30] Foreign Application Priority Data

Jul. 31, 1976 [DE] Fed. Rep. of Germany ... 7624195[U]

[51] Int. Cl.² .............................................. F24J 3/02
[52] U.S. Cl. .................................................. 126/270
[58] Field of Search .............................. 126/270, 271

[56] References Cited

U.S. PATENT DOCUMENTS

| 2,998,006 | 8/1961 | Johnston | 126/271 |
| 3,916,871 | 11/1975 | Estes et al. | 126/271 |
| 4,010,080 | 3/1977 | Tsay et al. | 126/271 |
| 4,046,135 | 9/1977 | Root et al. | 126/271 |
| 4,078,544 | 3/1978 | Holland et al. | 126/271 |

*Primary Examiner*—Carlton R. Croyle
*Assistant Examiner*—Richard E. Gluck
*Attorney, Agent, or Firm*—Haseltine, Lake, & Waters

[57] ABSTRACT

A flat solar collector arrangement used for collecting solar energy in which a metal tub serving as a carrier and made by a deep-drawn process, is filled with synthetic material. A heat carrier channel system and a collector plate are located on top of the synthetic material. A protective disk is connected by a rubber gasket ring to an edge of the metal tub, and a bellows-shaped device in the metal tub between the collector plate and the protective disk is used for influencing the enclosed volume. The metal tub may be made of galvanized sheet iron, and the upper rim of the metal tub is drawn outward, parallel to the bottom of the tub. The synthetic material, furthermore, may be in the form of a flaky styropor mass which serves as heat insulating material. The channel system and the collector plate are integrated as a single one-plate system. The metal tub, furthermore, has at least one opening which is closed by means of the bellows-shaped device, and is directed inward or outward.

10 Claims, 1 Drawing Figure

FLAT SOLAR COLLECTOR

BACKGROUND OF THE INVENTION

The present invention relates to a flat collector to collect solar energy, with a carrier which holds a collector plate, a heat carrier channel system and a protective disk (pane).

Flat collectors are used to collect solar energy and for storage in a heat carrier medium, ordinarily water. The temperatures reached there are adequate for home heating and pool heating, or for providing hot water.

With the continued consumption of energy reserves, such as crude oil, the use of solar energy collectors has become more urgent; the various technologies attempt to develop rational arrangements for large-scale use.

The general aim is to porduce collectors of long life and reliability and minimum purchase price, and minimum assembly, operating and maintenance costs. Presently known collectors meet only some of these requirements, but not all of them.

Presently known collectors with metal carriers are difficult to manufacture and final assembly is difficult. They essentially consist of a metal housing open on top and lined with heat-insulating material. This housing encloses the channel system, the collector plate and a protective disk and they are fastened by crimping the housing walls or screw-fastened metal or plastic strips. The lining with thermal insulator and the crimping or screw-fastening are time-consuming steps in manufacture.

There are also known collectors with a carrier housing of synthetic material which have a relatively short life and high material costs.

It is the object of the present invention to provide a flat collector of the foregoing species which can be produced by moderately-priced mass production methods and nevertheless has a long life and reliability.

another object of the present invention is to provide a solar collector of the foregoing character which is substantially simple in construction and may be economically fabricated.

A further object of the present invention is to provide a solar collector arrangement, as described, which may be easily maintained in service.

SUMMARY OF THE INVENTION

The objects of the present invention are achieved by providing a metal tub produced by the deep-draw method filled with synthetic material. On top of the synthetic material, the channel system and the collector plate are placed. The cover disk is connected by a rubber gasket with the edge of the metal tub, and the tub has a bellow-like device between the collector plate and the cover disk; this device determines the volume enclosed.

This design can be produced by simple manufacturing steps, with the time interval of the individual steps being very small. The metal tub which may be of galvanized sheet iron, has a much longer life and cheaper material cost than the plastic designs. The use of synthetic material, e.g., styropor flakes or glass wool, requires no manufacturing steps, such as fastening, pasting.

When the upper rim of the metal tub is simultaneously drawn by the deep-draw method toward the outside and parallel to the bottom of the tub, the cover plate can be clamped to the tub via a rubber gasket ring, the same way as windows are fastened to motor vehicles, with the remaining gap between the cover disk and collector plate being sealed sufficiently. The good seal is necessary to prevent entry of moist air and possible condensation of the air humidity on the disk and on the plate.

Heavy temperature change loads or air expansion change within the closed gap endangers the reliability of collectors through possible pressure damage. To prevent this, the invention provides bellow-like means which may be arranged on the wall or in the bottom of the metal tub and which cause a volume compensation in the gap during changing temperatures.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 2:
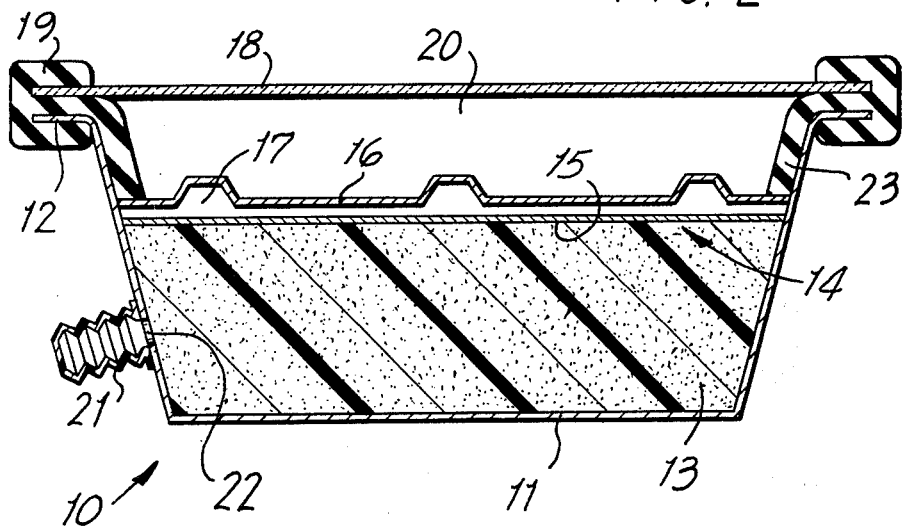
Figure 1:
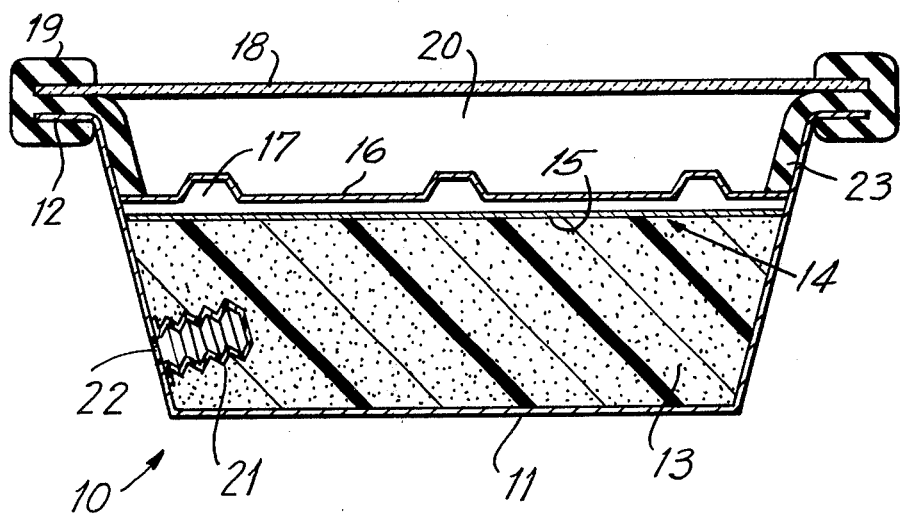
FIG. 1 shows a schematic sectional view of an embodiment of the present invention with the bellows directed inwardly; and, FIG. 2 shows another embodiment with the bellows directed outwardly.

The collector 10 shown in a vertical cross section comprises a metal tub 11 whose upper edge 12 is bent outward. The tub is filled up to a certain level with heat-insulating flake-like styropor or glass wool 13. This insulating layer carries a plate system 14 which has channels 17 between two partially connected plates 15 and 16. The upper plate 16 simultaneously constitutes the collector plate mounting an absorption layer. On the outer rim 12 of the tub there is a protective disk 18 fastened by means of a rubber gasket 19.

Between the plate system 14 and the protective disk 18 there remains an intermediate space 20 whose volume can be varied by means of a bellows 21 in accordance with the temperature fluctuations to which the collectors are usually exposed to balance the pressures. This bellows 21 which may be directed inward or outward is fastened to a perforation 22 of the tub 11 with a seal.

The line connections for the channel system 17, not shown, can be passed through the tub in the usual manner and connected to the channel system 17. By means of rubber flaps 23 which are an integral part of rubber ring 19, besides fastening the protective disk, the plate system 14 can be pressed against the styropor layer 13 so that no fastening with screws, or similiar devices, is necessary.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What is claimed is:

1. A flat collector for collecting solar energy, comprising: a carrier; a collector plate; a heat carrier channel system; a protective disk; said carrier comprising a metal tub filled with synthetic material, said channel system and said collector plate being located on top of the synthetic material; a rubber gasket ring; said protective disk being connected by said rubber gasket ring to an edge of said metal tub; and bellows means opening into said metal tub below said collector plate and said protective disk.

2. A flat collector as defined in claim 1 wherein said metal tub is comprised of galvanized sheet iron.

3. A flat collector as defined in claim 1 wherein said metal tub has an upper rim drawn outward parallel to the bottom of said tub, said tub being a deep-drawn tub.

4. A flat collector as defined in claim 1 wherein said synthetic material comprises a flaky styropor mass as heat insulating material.

5. A flat collector as defined in claim 1 wherein said channel system and said collector plate comprise an integral oneplate system.

6. A flat collector as defined in claim 1 wherein said metal tub has at least one opening closed by means of said bellows means.

7. A flat collector as defined in claim 5 wherein said rubber gasket ring fastens said protective disk and has rubber flaps protruding into said tub and fastening said plate system.

8. A flat collector as defined in claim 1 wherein said tub comprises a deep-drawn tub.

9. A flat collector as defined in claim 6 wherein said bellows means is directed inward.

10. A flat collector as defined in claim 6 wherein said bellows means is directed outward.

* * * * *